(12) United States Patent
Yalagandula et al.

(10) Patent No.: US 8,175,107 B1
(45) Date of Patent: May 8, 2012

(54) NETWORK ROUTING BASED ON MAC ADDRESS SUBNETTING

(75) Inventors: Praveen Yalagandula, Redwood City, CA (US); Jayaram Mudigonda, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 12/543,118

(22) Filed: Aug. 18, 2009

(51) Int. Cl.
*H04L 12/28* (2006.01)
(52) U.S. Cl. .................................. 370/408; 375/238
(58) Field of Classification Search .................. 370/408; 375/238
See application file for complete search history.

(56) References Cited

U.S. PATENT DOCUMENTS

| | | | | |
|---|---|---|---|---|
| 6,678,321 B1 * | 1/2004 | Graham et al. | ............... | 375/238 |
| 6,731,633 B1 | 5/2004 | Sohor et al. | | |
| 7,158,486 B2 * | 1/2007 | Rhodes | ...................... | 370/256 |
| 2005/0063382 A1 * | 3/2005 | Fenner | ...................... | 370/389 |
| 2008/0005329 A1 | 1/2008 | Bauman et al. | | |
| 2008/0107043 A1 * | 5/2008 | Smith et al. | ................... | 370/255 |
| 2008/0317039 A1 * | 12/2008 | Satterlee et al. | ............ | 370/395.5 |
| 2009/0207857 A1 * | 8/2009 | Alexander, Jr. | ............... | 370/474 |

OTHER PUBLICATIONS

Al-Fares, et al.; "A Scalable, Commodity Data Center Network Architecture"; SIGCOMM '08; Aug. 17-22, 2008; ACM; Seattle, USA.

* cited by examiner

*Primary Examiner* — Robert Wilson
*Assistant Examiner* — Wei Zhao

(57) ABSTRACT

A method for routing data on a fat-tree network using network switches includes assigning a customized MAC address to each host device in the network. The customized MAC address has a set of bits for each level in the fat-tree network, each set of bits corresponding to a division of the network in which the host device is located. Each switch applies a MAC subnet mask to a destination MAC address of each received packet and performs at least one hashing function on the masked destination MAC address to determine a forwarding port for the packet.

20 Claims, 10 Drawing Sheets

NETWORK ROUTING BASED ON MAC ADDRESS SUBNETTING

BACKGROUND

In a tree network topology, network nodes are hierarchically organized into a series of levels. One or more core devices reside at the top level of the hierarchy, and, several host devices typically reside at the lowest level of the hierarchy. A fat tree network is a network in which bandwidth is allocated among the levels of a tree topology such that devices at higher levels in the tree have access to greater amounts of bandwidth for data transmission through the network. Multiple cores may be used to emulate "fat" links at the higher levels of a fat tree network, thus creating multiple paths between hosts. By having multiple paths between host devices, more bandwidth may be available between the host devices.

In spite of the potential bandwidth advantages associated with a multi-core fat tree topology, it is a challenge to route data over such a network in a cost-effective way that exploits these advantages. Specialized network structures such as fat-tree structures typically require more expensive networking equipment. Often times, these pieces of equipment must be designed specifically for their intended placement in a network structure. Other pieces of network equipment may require extensive configuration to perform the operations required of them based on their position within the network structure.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As mentioned above, a fat-tree network topology with multiple core devices can provide multiple redundant paths between two host devices on a network. With this redundancy, all paths between two host devices may potentially be utilized to enable more data transmission bandwidth between the host devices. Nevertheless, implementing such a network has generally required customized, costly equipment.

Additional difficulties arise from the fact that network routing in the art is typically based on destination IP addresses in data packet headers. Routers generally use IP addresses and a process referred to as IP subnetting to organize a network by dividing it into sub-networks. With a sub-network structure, when a host moves from one sub-network to another sub-network, the IP address of the host device must often be reassigned based on the new sub-network to which it is connected. This may be problematic, especially with network applications that make access decisions and other calculations based on the IP addresses.

In light of these and other difficulties, the present specification relates to the use of customized MAC addresses for routing purposes on a fat-tree network. This method involves modifying network switches to forward data based on the customized destination MAC address of an incoming data packet. In addition, hashing methods may be used to determine which one of the multiple paths to use. This method offers several advantages. Modifying commodity off-the-shelf network switches to route network traffic based on a customized MAC address is generally much less expensive than customizing network routers or switches for IP routing within a complex network topology. Because MAC addresses are not visible outside of a network structure, they can be customized by fragmentation to represent the position of a host device within the network topology. These customized MAC addresses may then be forwarded by the switches using much simpler rule sets than those necessary for IP address-based routing in the same network topology. A MAC address subnetting process involving the use of a MAC address subnet mask may be used to facilitate the routing of data on a fat-tree network.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
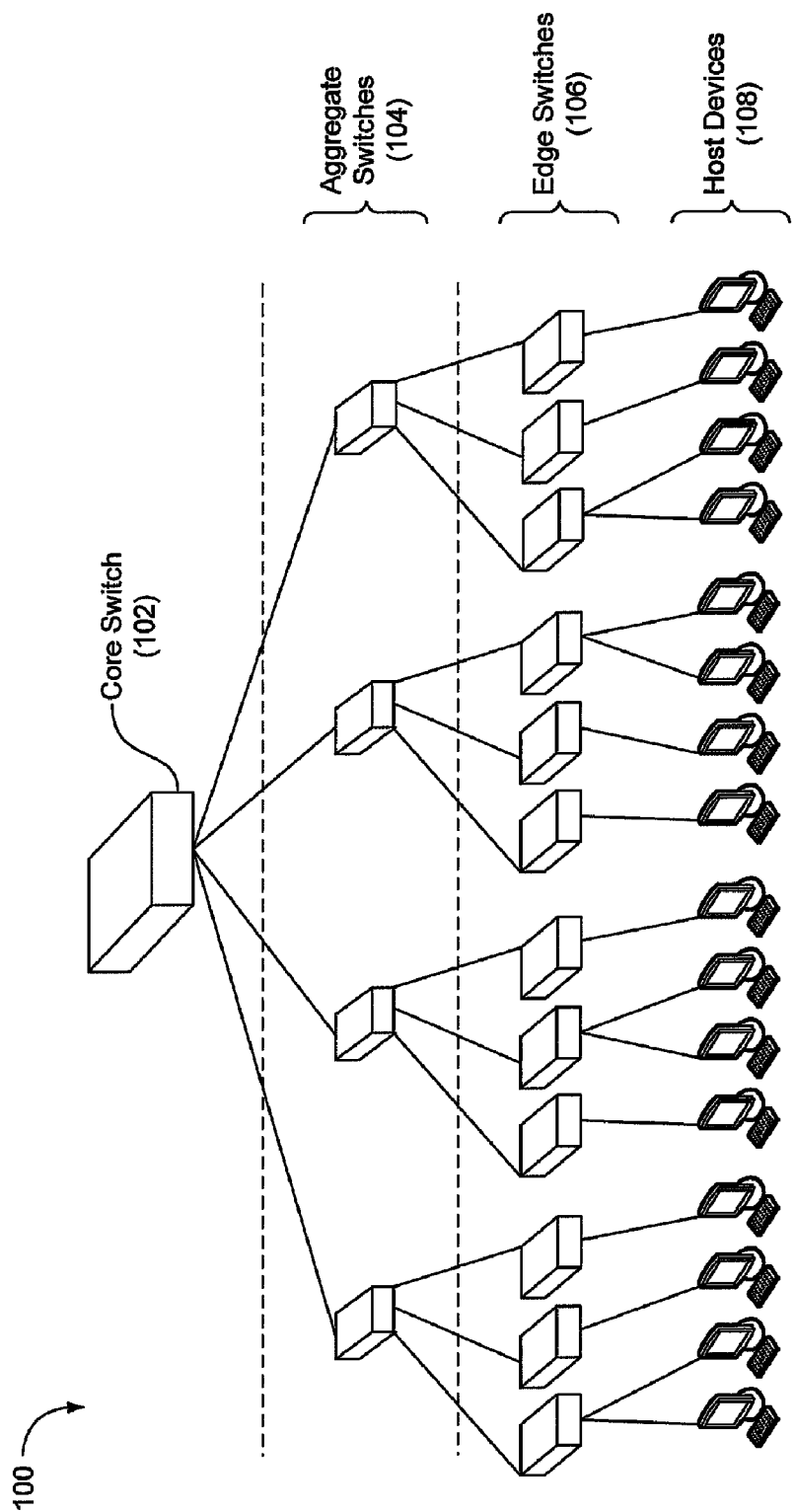
FIG. 1 is a diagram of an illustrative network having a three tiered standard tree topology, according to one embodiment of principles described herein.

FIG. 1 illustrates an exemplary network (100) having a three tiered standard tree topology. In this type of a network structure a core switch (102) is connected to each aggregation switch (104) in a set of aggregation switches (104). The number of aggregate switches (104) may be limited by the number of ports on the core switch (102). Each aggregation switch is connected to a number of edge switches (106). One of the ports on each aggregate level switch will connect to the core switch (102). The rest of the ports may be connected to edge level switches (106). The edge level switches (106) are directly connected to host devices (108). One port on each edge switch will be connected to an aggregate level switch (104) above it and the rest of the ports may be used to connect to host devices (108). Though this tree structure works well for some applications, many traffic intensive applications can cause one or more links to become bottlenecks and lead to performance inefficiencies in such topologies.

Figure 2:
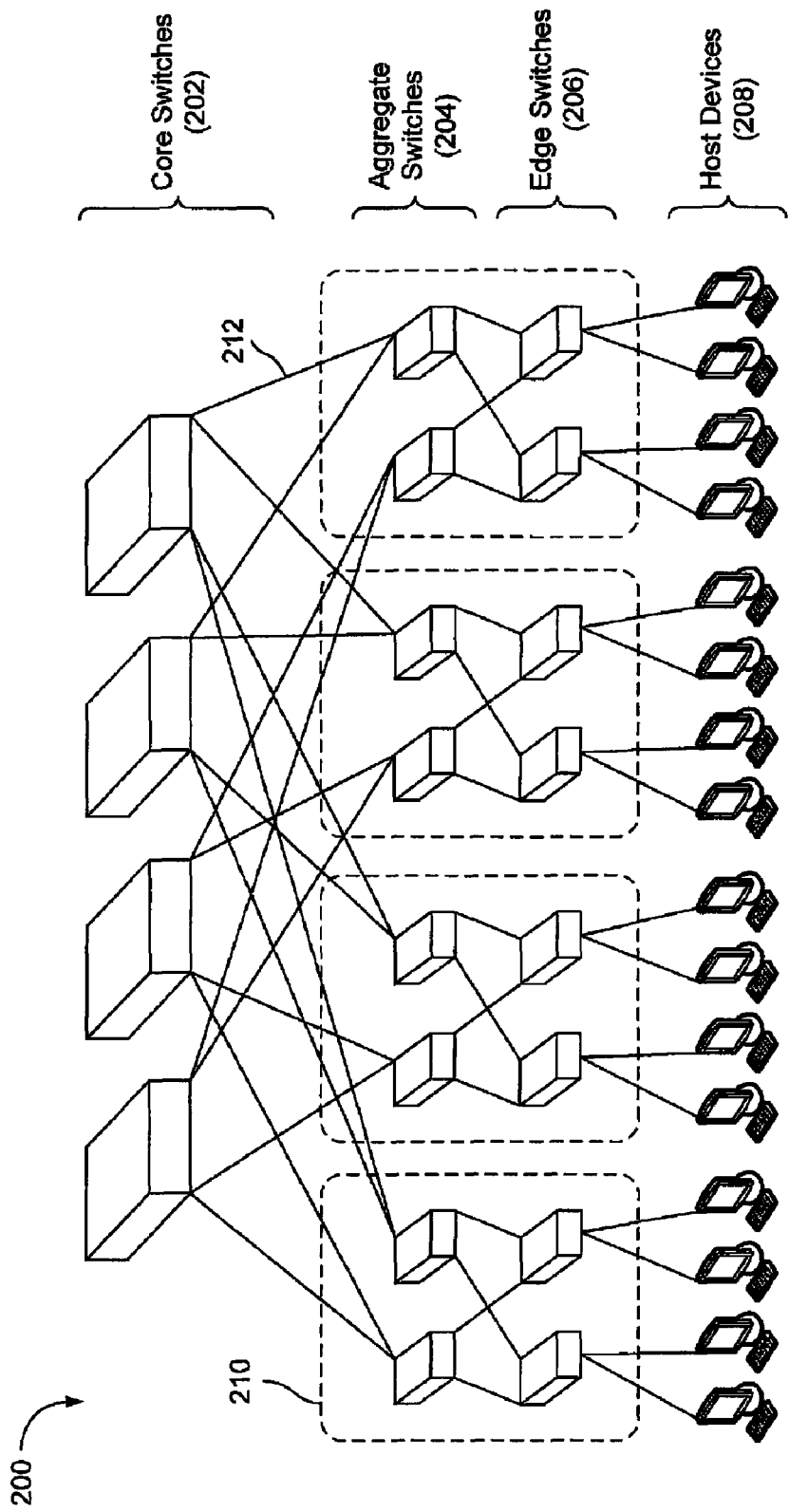
FIG. 2 is a diagram showing an illustrative fat-tree network structure, according to one embodiment of principles described herein.

FIG. 2 is a diagram showing an illustrative multiple core fat-tree network structure. This type of network structure (200) includes a level of core switches (202). In one embodiment, the number of core switches could be $(k/2)^2$. For purposes of explanation, the number k will refer to the number of ports on the switches used. In the present example, k=4 because each of the core switches (202) has four ports, and there are a total of 4 core switches (202). The rest of the switches (204, 206) on the network (200) can be divided into k pods (210). Each pod (210) contains a level of aggregate switches (204) and a level of edge switches (206). In certain embodiments, each pod may contain k/2 aggregate (204) switches and k/2 edge switches (206) such that the total number of aggregate switches (204) will be equal to $k^2/2$. In such embodiments, the total number of edge switches (206) will also be $k^2/2$. All switches (202, 204, 206) may be connected to other switches (202, 204, 206) or host devices (208) via at least one communication medium (212). The type of communication medium used could include but is not limited to a standard Ethernet cable, a coaxial cable, a fiber optic cable, one or more electrical conductors, and the like. Additionally or alternatively, some or all of the switches (202, 204, 206) may be interconnected wirelessly.

In the present example, within each pod (210), each aggregate switch (204) has k/2 downlink ports and k/2 uplink ports. Each uplink port of each aggregate switch (204) is connected to a core level switch (202) and each downlink port is connected to each edge level switch (206) within the pod (210). Each edge level switch (206) may also have k/2 uplink ports and k/2 downlink ports in the present example. The uplink ports of the edge level switches (206) are connected to each aggregate level switch (204) within the pod and the downlink ports provide connections to host devices (208). In the present example, a total of $k^3/4$ host devices (208) may be connected to the network (200). A switch (202, 204, 206) typically contains a lookup table indicating how a received packet should be forwarded (i.e., criteria for determining to which port the received packet will be forwarded).

As described above, the exemplary multiple core, pod-based fat-tree network shown in FIG. 2 has k=4. Thus there are four core level switches (202) and four pods (210). Each pod (210) contains two aggregate switches (204) and two edge switches (206). Each edge switch (206) allows up to two host devices (208) to be connected. A total of 16 host devices (208) may be connected to the network (200).

Figure 3:
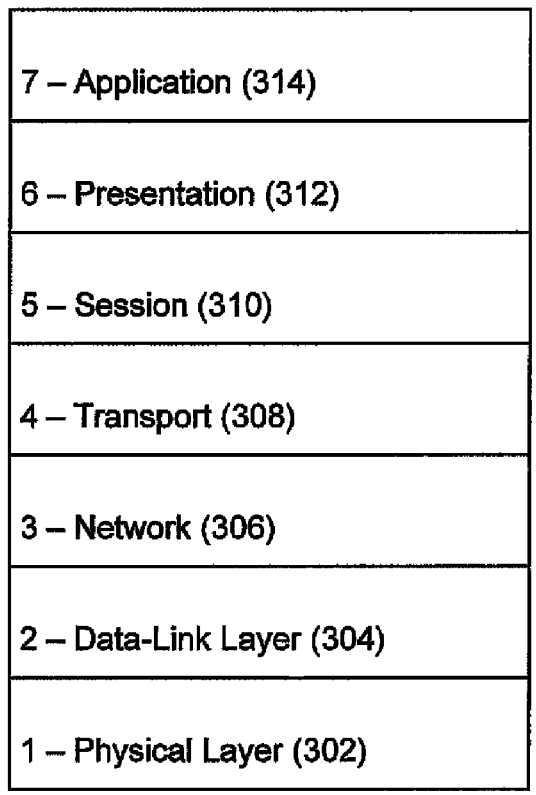
FIG. 3 is a diagram of the OSI reference model, according to one embodiment of principles described herein.

FIG. 3 is a diagram of the 0SI reference model (300). The Open Systems Interconnection (OSI) model is an abstract model describing layered networking. Each layer is a collection of conceptually similar functions that provide services to the layer above and receive services from the layer below.

The physical layer (302) describes the physical media over which network traffic is communicated. The data-link layer (304) provides physical addressing of network interface hardware between systems on a network. Network switches generally operate at the data-link layer using MAC addresses as the physical addresses. The network layer (306) handles route determination and logical addressing. The network layer (306) uses an Address Resolution Protocol (ARP) table to translate assigned logical addresses to the physical addresses provided by the data-link layer (304). Network routers generally operate at the network level using IP addresses as logical addresses.

The transport layer (308), the session layer (310), the presentation layer (312), and the application layer (314) all provide additional services. The higher the level, the closer the services offered are to the end user. The four upper layers are not particularly relevant to the invention described herein, thus a detailed description of them will not be given.

As mentioned above, network routers or switches with the capability of IP routing are generally used when dividing a network into sub-networks and transferring data between those sub-networks. IP addresses are logical addresses which can arbitrarily be assigned to a physical address. A MAC address is a physical address that is associated with a specific piece of network interface hardware.

Figure 4:
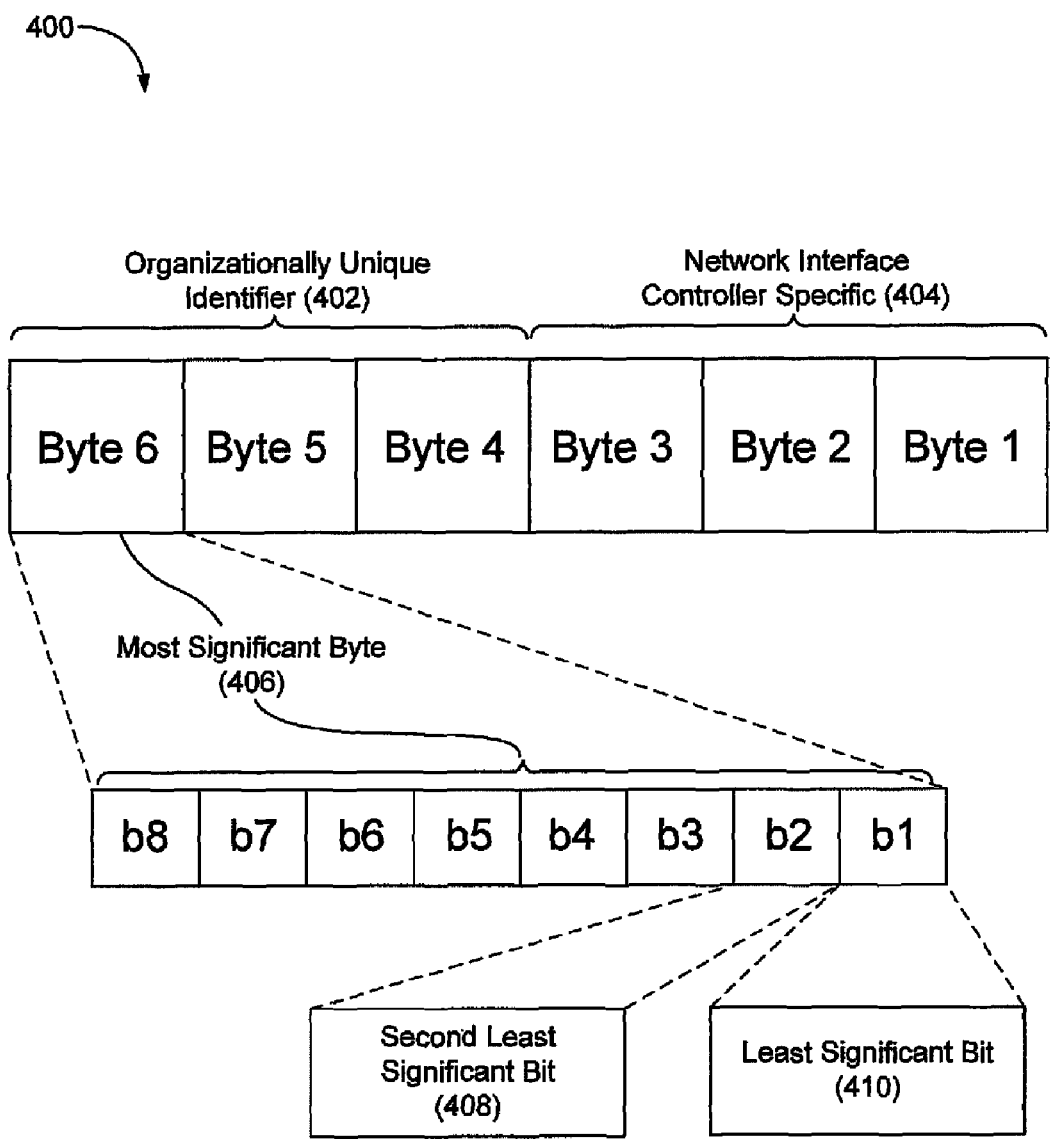
FIG. 4 is a diagram illustrating the components of a MAC address, according to one embodiment of principles described herein.

FIG. 4 is a diagram illustrating the components of a MAC address. A MAC address consists of 6 bytes or 48 bits. It is typically represented in a six point hexadecimal format, each hexadecimal number representing four bits and each hexadecimal number pair representing one byte. Generally, the first three most significant bytes represent an Organizationally Unique Identifier (OUI) (402) which is assigned by the manufacturer. The three least significant bytes are specific to a particular network interface controller (404).

The least significant bit (410) of the most significant byte (406) is reserved to identify whether the address is unicast, meaning a packet is meant to be sent to only one piece of network interface hardware, or multicast, meaning a packet is sent to multiple pieces of network hardware. A "1" indicates the MAC address is unicast and a "0" indicates that the MAC address is multicast. Though a MAC address is assigned by the manufacturer, most MAC addresses can be changed. If the MAC address is assigned by someone other than the manufacturer, it is considered to be locally administered. The second least significant bit (408) of the most significant byte (406) indicates if the MAC address is assigned by the manufacturer or is locally administrated. A "1" indicates the MAC address is locally administered and a "0" indicates the MAC address was assigned by the manufacturer.

Figure 5A:
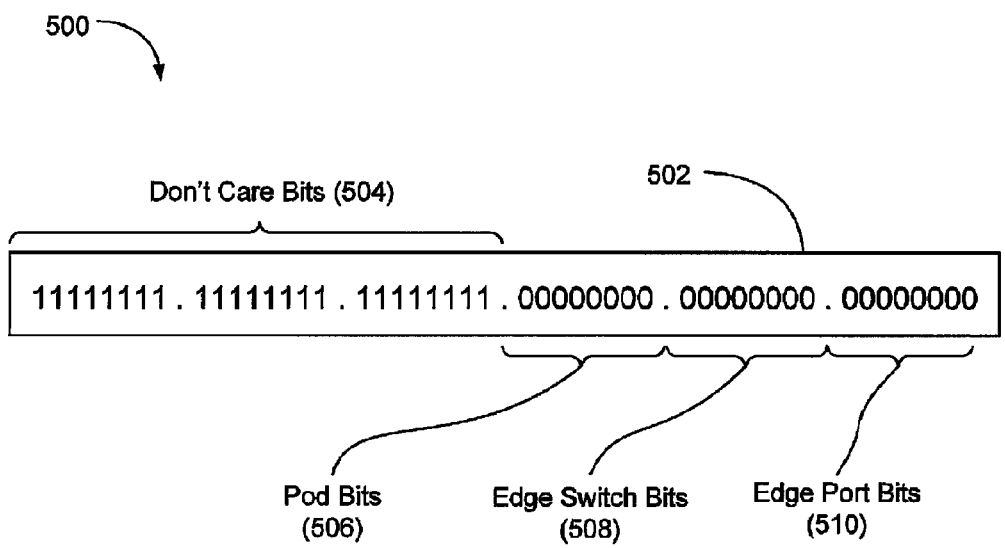
FIG. 5A is a diagram showing an illustrative method for allocating different sets of bits to identify different layers of a fat-tree network, according to one embodiment of principles described herein.

FIG. 5A is a diagram showing an illustrative method for customizing a MAC address by allocating different sets of bits to identify different aspects of a fat-tree network. As mentioned above, a MAC address is represented by 48 bits. Two of the bits have a specified purpose, leaving 46 bits available for customization. In general, a smaller number of bits is sufficient for most addressing methods, thus a number of "don't care bits" (504) may be used. For simplicity, all of the don't care bits (504) may be set to the value "1." However, either a setting of "0" or "1" may be allowed. A MAC address can have a first set of bits allocated for identifying the pod with which a host device is associated. A second set of bits may be allocated for identifying the edge switch within a pod with which a host device is associated. A third set of bits may be allocated for identifying which port of an edge switch with which a host device associated. Throughout this specification, an example will be discussed in which there are three levels in the fat tree network. However, a network embodying principles described herein may include additional or fewer levels. A MAC address may be divided into a number of set of bits equaling the number of the number of levels in the network.

The MAC address (502) shown in the present example has the third least significant byte allocated to the pod bits (506), the second least significant byte allocated to the edge switch bits (508), and the least significant byte assigned to the edge port bits (510). The pod bits (506) of a MAC address assigned to a particular device will identify a pod in the fat-tree network to which a host device corresponds. The edge switch bits (508) of a MAC address assigned to a particular host device will identify an edge switch within that pod to which the host device is connected. Finally, the edge port bits (510) of a particular device will denote which port within the edge switch to which a host device is connected.

It is not necessary that bit assignments be fragmented into groups equaling one byte or eight bits. For example, in one embodiment, 10 bits could be assigned to each the pod bits (506), the edge switch bits (508), and edge port bits (510). The number of bits assigned to each section may be enough bits to represent all the switches within the sections respective category. For example, if the fat-tree network consists of 16 pods, then only four bits allocated as pod bits would be enough to differentiate all 16 pods. Throughout this specification and the appended claims, the pod bit section, edge switch section, and edge port section of bits will be referred to as the relevant bit sections.

Figure 5B:
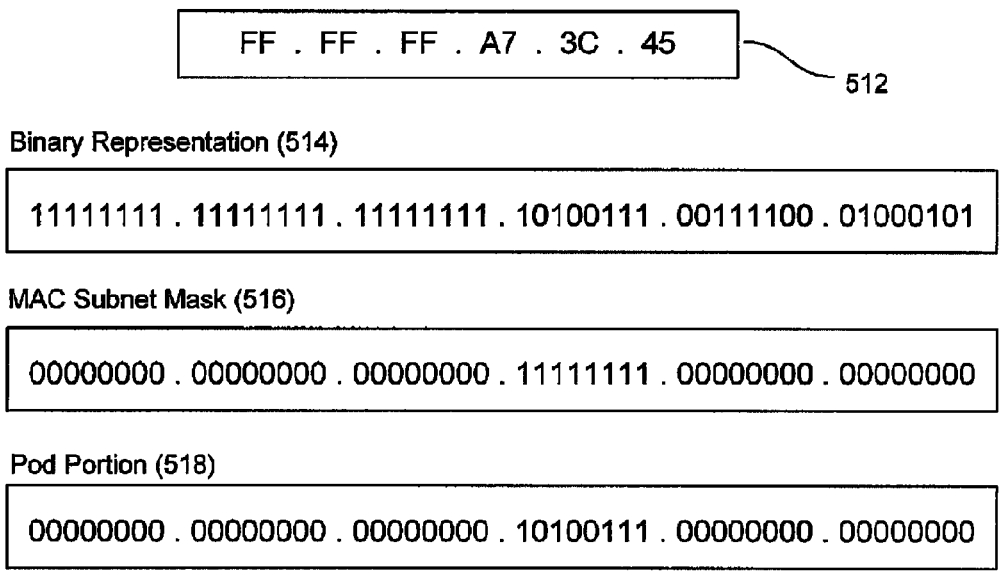
FIG. 5B is a diagram showing an illustrative method for using subnet masks on a MAC address, according to one embodiment of principles described herein.

FIG. 5B is a diagram showing an illustrative method for using a subnet mask (516) on a MAC address (512). A subnet mask (516) is a value which when represented in binary form, contains the value "1" in the bits corresponding to bits of an address value represented in binary form which are desired to be exposed. A value of "0" is assigned to the bits of the subnet mask corresponding to the bits of an address value in binary form desired to be zeroed out. This is done by performing the bitwise "AND" operation with the subnet mask and the value representing an address as the operands.

FIG. 5B illustrates an exemplary MAC address (512) in hexadecimal dotted form. The binary representation (514) of the MAC address (512) is also shown. A MAC subnet mask (516) designed to expose the pod bits (506) while zeroing out all other bits is shown. When the bitwise "AND" operation is performed with a MAC address (514) and the MAC subnet mask (516) shown as the operands, the pod portion (518) is left the same (506) while all other bits are zeroed out. A different subnet mask applying the same principles may be used to expose the edge switch bits (508), the edge port bits (510) or any desired combination of bits within the MAC address (512). Throughout the present specification and in the appended claims, the term "MAC subnet mask" refers to a subnet mask that is designed to expose certain sections of a MAC address.

As mentioned above, though structuring a network with a multiple core device fat-tree topology as shown in FIG. 2 increases the performance, it relies on expensive IP router or high end switches capable of IP routing. This equipment must be specially designed to handle this kind of network. In addition, when a host device moves from one port to another, its IP address will have to be changed. This can cause complications as many network applications are based on the host device's IP address. The applicant has discovered a way to modify less expensive network switches which operate at the data-link layer to route traffic based on assigning customized MAC addresses to devices within the network structure. MAC addresses may be divided up into separate sections much in the same way IP addresses are used to create subnets. The various sections of the MAC address will instruct the modified networks where to route network traffic.

According to one illustrative embodiment, the modification to the switches could be the installment of a computer program product that performs the functions necessary to route traffic based on a customized MAC address. The computer program may include a plurality of instructions embodied as computer-readable program code on a computer-readable storage medium. For example, the computer program product may be implemented in a network switch as either firmware or software executed by the network switch.

Figure 6:
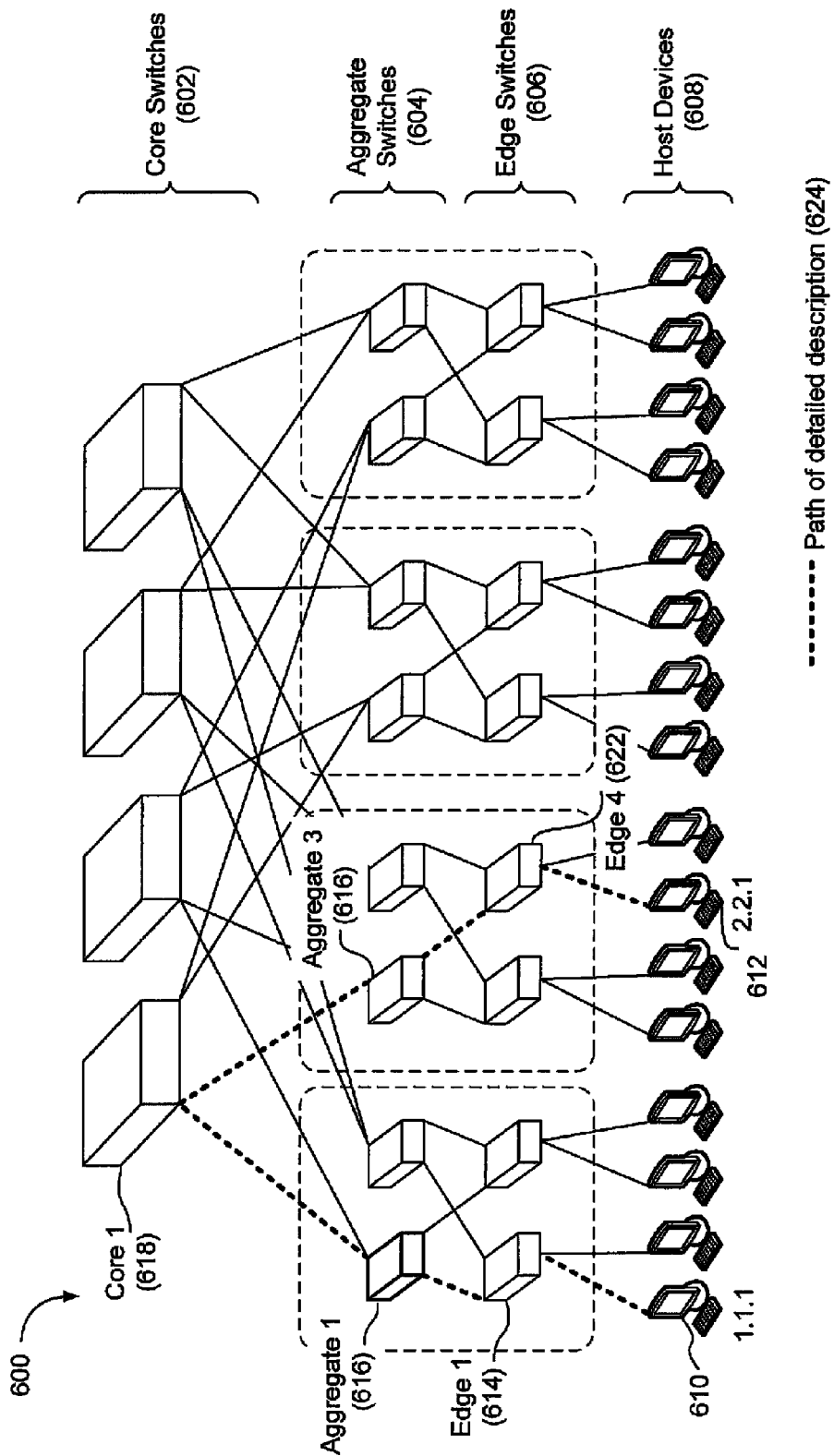
FIG. 6 is a diagram showing an illustrative routing path through an illustrative fat-tree network structure, according to one embodiment of principles described herein.

FIG. 6 is a diagram showing an illustrative routing path (624) through an illustrative fat-tree network structure (600). As mentioned above, a fat-tree network structure with multiple core devices provides multiple paths between two host devices (608) on the network (600). FIG. 6 illustrates one possible path (624) between a first host device (610) and a second host device (612), a detailed description of which will be given. For purposes of description and to avoid redundancy, only the relevant bit sections of a host device's (608) MAC address are displayed and are shown in decimal form.

In one embodiment, when a host device (608) connects to a port on the fat-tree network (600), it may be dynamically given a MAC address based on the specific port to which it is connected. For example, if a host device is connected to the second port on the first edge switch in the third pod, the relevant bit section of its assigned MAC address would be 3.1.2, the "3" being in the pod bit section, the "1" being in the edge switch section, and the "2" being in the edge port bit section. The network switches may be assigned any arbitrary MAC address.

When transferring data from a source host device to a destination host device, a data packet will first be sent to the edge switch (606) to which the source host device is connected. That edge switch (606) will then use a MAC subnet mask exposing all three relevant bit sections of the MAC address. The edge switch (606) may then look for the destination MAC address in its lookup table. A lookup table is a table of addresses that tells the switch which port to use when forwarding a received data packet. The appropriate port is determined based on the destination MAC address of the data packet. If a match is found in the lookup table, then the destination MAC address is indeed assigned to one of its ports, the switch (606) will then forward the data packet down the appropriate downlink to the destination host device. This will be the case if the destination host device is connected to the same switch as the source host device. If there is no match in the lookup table, then the destination host is not connected to one of its ports. The edge switch (606) will then forward the data packet up an uplink to one of the aggregate level switches (604). The determination of which uplink port to use will be discussed in detail below. When the data packet reaches an aggregate level switch (604), the aggregate level switch (604) will then use a MAC subnet mask to expose both the pod bit section and the edge switch bit section. It will then look for a match in its lookup table. If it does indeed find a match, it will forward the data packet down one of the downlinks to the appropriate edge switch (606). This will be the case if the destination host device is within the same pod as the source host device but connected to a different edge switch (606). If a match is not found in the lookup table, it will then forward the data packet up one of the uplinks to a core level switch (602).

When a data packet reaches a core level switch (602), it will use a MAC subnet mask to check only the pod bit section. Because a single core level switch (602) is connected to an aggregate switch in every pod, the core level switch (602)

should always find a match. It will then forward the data packet to the appropriate aggregate level switch (604). As before, the aggregate level switch (604) will use a MAC subnet mask to expose the pod bit section and the edge switch bit section. When it finds a match in its lookup table, it will send the data packet down the appropriate downlink to the appropriate edge level switch (606). The edge level switch (606) will then use a MAC subnet mask exposing all three relevant bit sections of the MAC address. When the edge level switch (606) finds a match in its lookup table, it will then forward that data down the appropriate downlink to the destination host device.

For example, when sending a data packet from the host device assigned the MAC address of 1.1.1 (610) to the host device assigned the MAC address 2.2.1 (612), the data packet will first be sent up the uplink to the edge 1 switch (614). That edge switch (614) will then use a MAC subnet mask to expose the relevant bit sections and then check to see if the MAC address 2.2.1 is in its lookup table. When it finds that the MAC address 2.2.1 is not in the lookup table, it will forward the data packet up an uplink to an aggregate level switch (604). In the case of this example, it will forward it to the aggregate 1 switch (616). That aggregate level switch (616) will then use a MAC subnet mask to expose only the pod bit section and the edge bit section. It will then look to see if a MAC address having a "2" in the pod bit section and a "2" in the edge switch section is in its lookup table. When it is determined that a MAC address with the desired value is not within the lookup table, it will then forward the data packet up an uplink to a core level switch (602). In the case of this example, the data packet is forwarded to the core 1 switch (618).

The core 1 switch (618) will then use a MAC subnet mask to check only the pod bit section of the destination MAC address 2.2.1. When it determines that the pod bit section is a 2, it will forward the data packet down the appropriate downlink to send the data packet to the aggregate 3 switch (620) in pod number 2. As with the aggregate 1 switch (616), the aggregate 3 switch (620) uses a MAC subnet mask to expose the pod bit section and the edge bit section. It will then look for a match in its lookup table. When the match is found, the data packet will be forwarded down the appropriate downlink to the edge 4 switch (622). The edge 4 switch (622) will then use a MAC subnet mask exposing all relevant bit sections and then check to see if the destination MAC address of 2.2.1 is within its lookup table. When it finds the match, it will send the data packet down the appropriate downlink to the destination host device having the MAC address assignment 2.2.1 (612).

The above mentioned addressing and routing method is merely one example of how a fat-tree network with multiple cores may be set up to route network traffic. The present invention is in no way limited by the above mentioned addressing methods.

The examples of the routing of data packets described above assume that all host systems are using a customized MAC address embodying principles described herein. If there are some host systems not using a customized MAC address on the network, it is possible that the core switches will not find a match for a destination MAC address. If this is the case, standard switching protocols may be used.

Figure 7A:
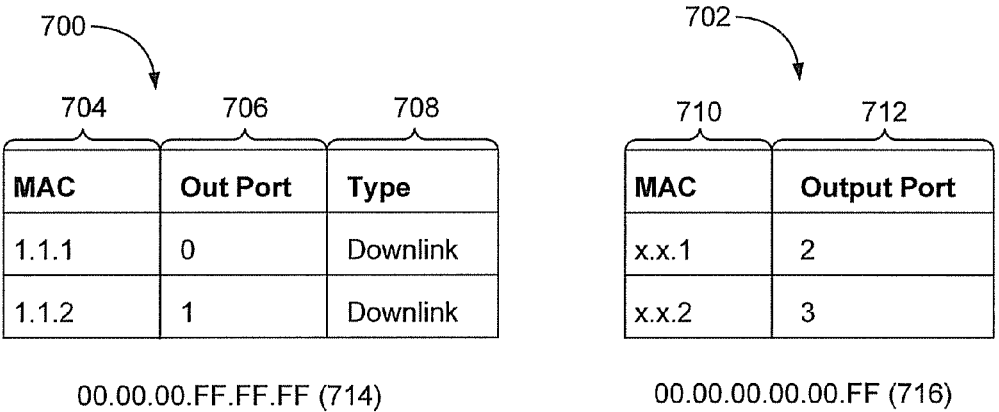
FIGS. 7A-7C are tables illustrating exemplary lookup tables used by different levels of switches in a fat-tree network, according to one embodiment of principles described herein.
Figure 7B:
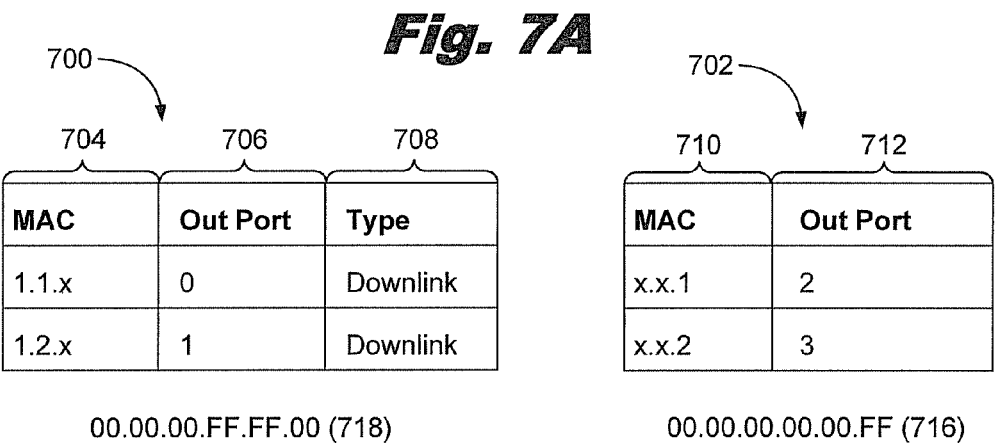
Figure 7C:
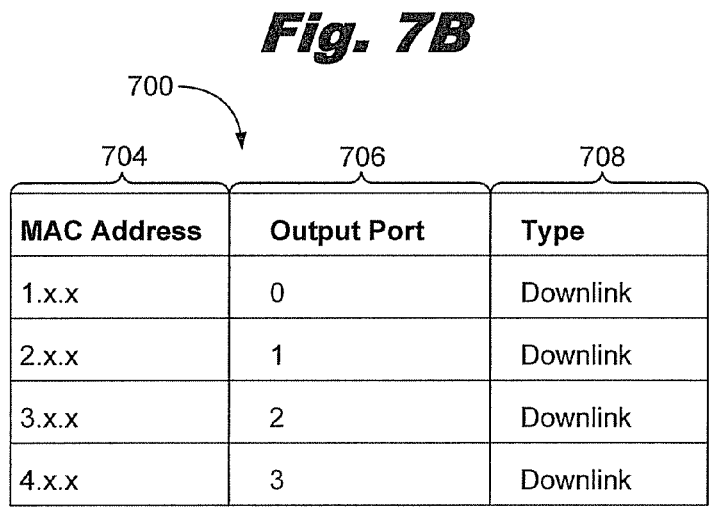

FIGS. 7A-7C are tables illustrating exemplary lookup tables of the different levels of switches in a fat-tree network. As mentioned above, a switch will use its lookup table to determine the port on which to forward a data packet. The appropriate port is determined based on the destination MAC address of the data packet. If a switch finds a match in its lookup table, it will forward the data packet down the appropriate downlink. If it does not find a match, it must forward the data packet up to an uplink. An aggregate level or edge level switch within a fat-tree network will have k/2 uplinks. Thus, an aggregate or edge level switch will need a method to determine which uplink to use. This can be done by using a separate MAC subnet mask to expose only the port section of a destination MAC address and using a second lookup table to determine which uplink port to forward the data.

FIG. 7A illustrates an exemplary lookup table to be used by the edge 1 switch (614, FIG. 6) within the fat-tree network. The table (700) on the left illustrates a first table in which the switch uses to forward data. The switch will use a MAC subnet mask (714) to expose all three relevant bit sections. In this case, the two possible matches are 1.1.1 and 1.1.2, which are shown in the MAC address column (704) of the table (700). The output port column (706) will tell the switch which port to forward data to if the corresponding MAC address is found. The type column (708) indicates if it is an uplink port or a downlink port. Though switches do not maintain this information, they are shown in the tables in FIG. 7 for illustrative purposes. If no match is found within the first table (700), the switch will then use an alternate MAC subnet mask (716) to expose only the port bits of the destination MAC address and use a secondary lookup table to determine which uplink port to use. The MAC address column (710) of the secondary table (702) indicates the port bit section of the destination MAC address and the output port column (712) indicates the uplink port to which to forward a data packet. In one embodiment, the first table (700) and the secondary table (702) could be combined into one table. In this case, if a match is not found for the destination MAC address being masked by the first subnet mask which exposes all three relevant bit sections, the alternate subnet mask will be used on the destination MAC address and the table will be searched again for a match.

FIG. 7B illustrates an exemplary lookup table to be used by the aggregate 1 switch (616, FIG. 6) within the fat-tree network. Again, the table on the left (700) is a first lookup table and the table on the right (702) is a secondary table used to determine which uplink port to use in the event that there is no match in the first lookup table indicating a downlink to forward data to. The aggregate level switch uses a MAC subnet mask (718) to expose the pod bit section and the edge bit section. It will then look for a match in the first lookup table (700). If a match is found, the data will be forwarded down the appropriate downlink port as indicated by the lookup table (700). If no match is found, an alternate MAC subnet mask (716) exposing only port bits may be used to lookup an entry in a secondary table (702) to determine which uplink port to use, and thus, which core switch to which to forward a data packet. Like in FIG. 7A one embodiment may include one table instead of two separate tables.

FIG. 7C illustrates an exemplary lookup table to be used by core level switches. Each core level switch has exactly one downlink to each pod within, the network. Thus, each core level switch may have the same lookup table (700). The core level switches may use a MAC subnet mask which exposes only the pod bit section. The lookup table will then tell the switch which downlink to forward data to. Core switches will contain only downlink ports, thus a secondary lookup table is not necessary.

When working with relatively large lookup tables, the efficiency at which the switch is able to find a match can be increased through a method referred to as hashing. Hashing is a function wherein a relatively large amount of data such as a MAC address is converted into a smaller datum which is used as an index to an array. This allows for very fast lookup of entries within a table. Though previous figures illustrate simple addressing schemes starting from 1 and incrementing by one, some addressing schemes may involve the use of all bits allocated to a particular section. For example, if 12 bits are allocated for the pod bit section, each pod may have a number ranging from 0-4095, and not necessarily be in any particular order. It is only necessary that each pod be uniquely identified. Thus, a method for quickly finding a match within a lookup table is useful.

Figure 8:
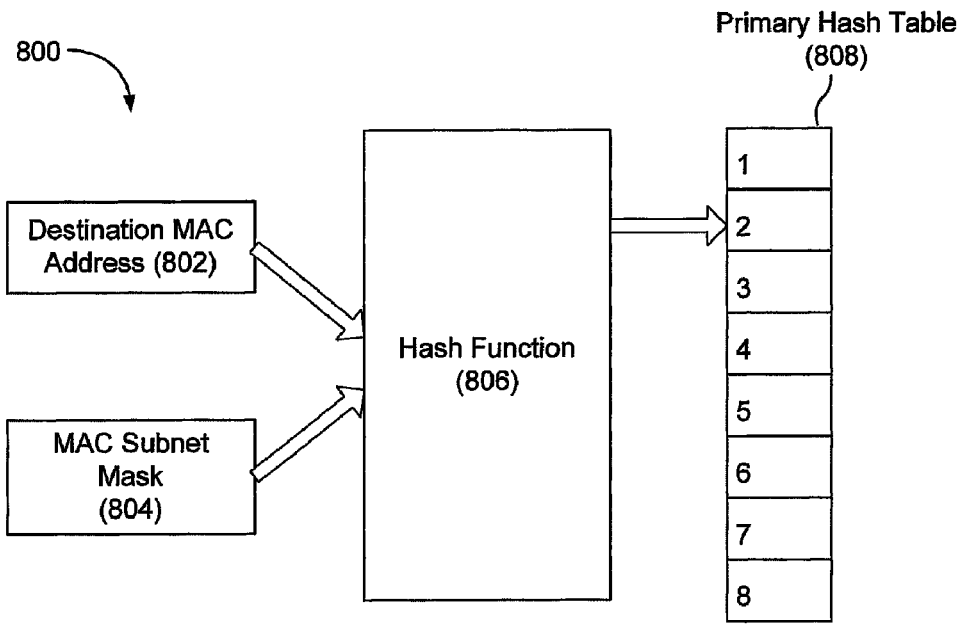
FIG. 8 is a diagram illustrating an exemplary hash method which could be used by network switches on a fat-tree network, according to one embodiment of principles described herein.
Figure 8:
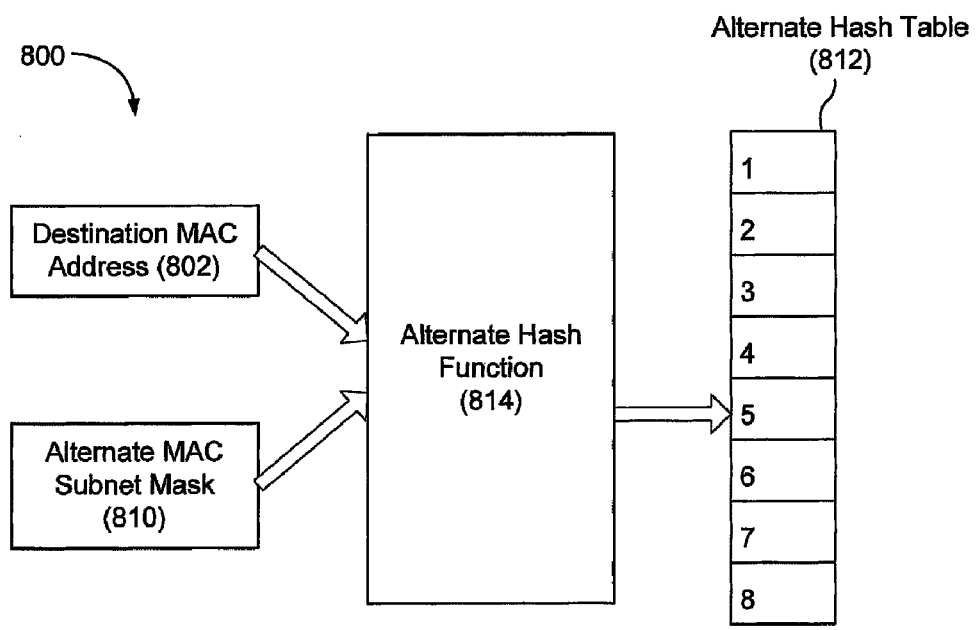

FIG. 8 is a diagram illustrating an exemplary hash method (800) which could be used by network switches on a fat-tree network. A typical network switch performs a hash on the entire 48 bits of a MAC address. The invention described herein includes a hashing method that has two inputs. One input being the destination MAC address (802), and the other input being a MAC subnet mask (804). The hash function (806) will then be applied to the bits exposed by the MAC subnet mask (804) and the hash result may determine an index within a first hash table (808) containing the numbers of the downlink ports. If the destination MAC address matches a MAC address in the first hash table, it is referred to as a hit. If a hit has occurred, data may then be forwarded to the downlink port in the first hash table. If the destination MAC address (802) does not match any MAC address in the hash, it is referred to as a miss. In the event of a miss, an alternate hash using an alternate MAC subnet mask (810) may be performed. An alternate hash function (814) and hash table (812) can be used to determine which uplink port to forward the data. The alternate hash function (814) can be designed so that there will always be a hit when the proper MAC subnet mask (810) is used.

Though the above described process relates to a three-level fat-tree network, the same principles may be applied to a fat-tree network of two or more levels. A set of bits for each level in the network may be allocated from the customized MAC address. Each set of bits may correspond to a division within the fat-tree network. A host device may be assigned a MAC address with the values from each set of bits describing the position of the host device within the fat-tree network. Those familiar with the relevant art will be able to apply the principles described herein relating to a three-level network to a fat-tree network of varying sizes.

Figure 9:
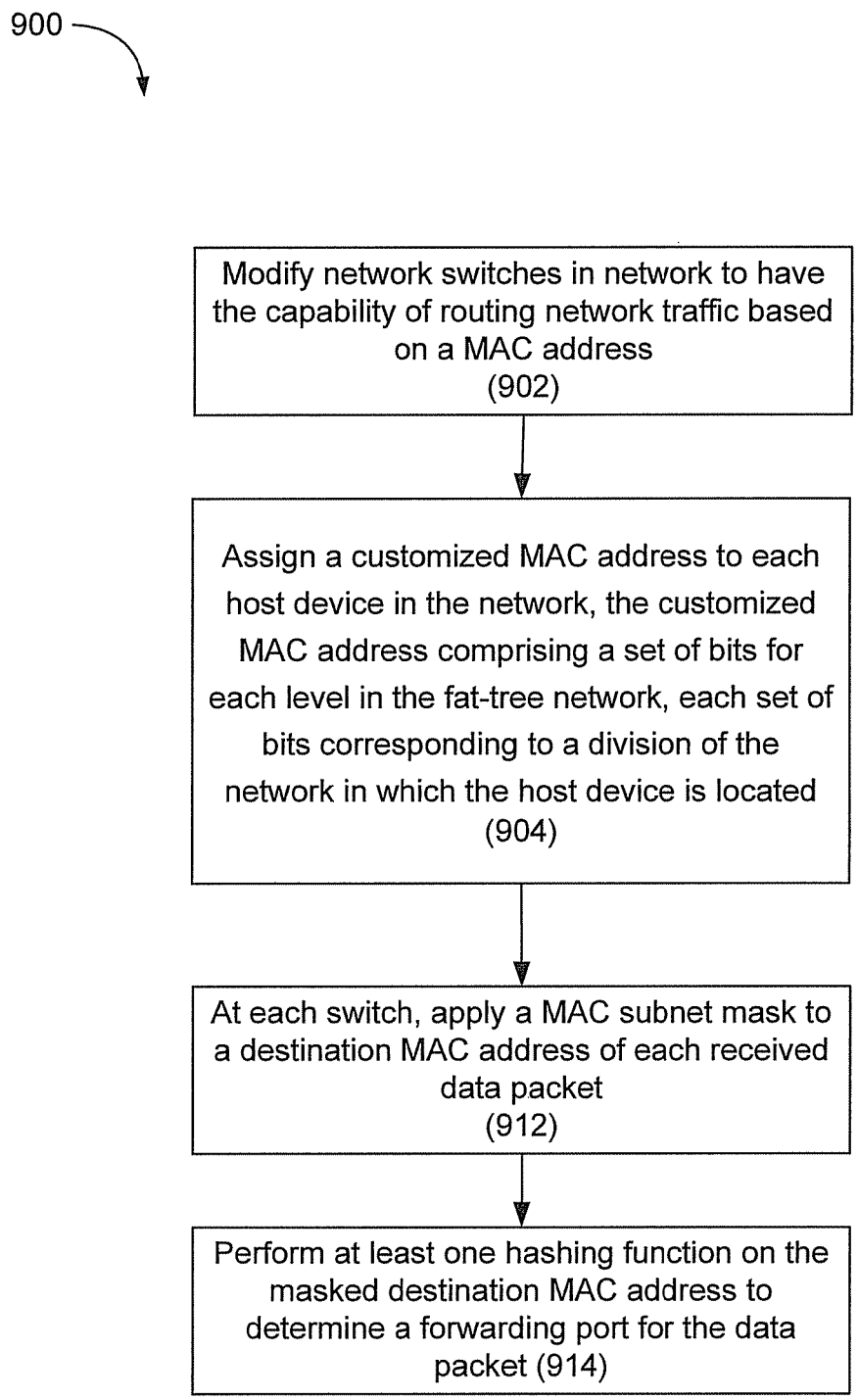
FIG. 9 is a flow chart illustrating the process of using MAC address subnetting on a fat-tree network, according to one embodiment of principles described herein.

FIG. 9 is a flow chart (900) illustrating the process of using MAC subnetting on a fat-tree network with multiple core devices. The first step would be to modify (step 902) the network switches in the network so that they would have the capability of routing network traffic based on the MAC address. Next, each host device within the network is assigned (step 904) a customized MAC address. The customized address includes a set of bits for each level in the fat-tree network, each set of bits corresponding to a division of the network in which the host device is located. At each switch, a MAC subnet mask is applied (step 912) to a destination MAC address or each received data packet. At least one hashing function is performed (step 914) on the masked destination MAC address to determine a forwarding port for the data packet. In some cases, this process may need to be repeated with alternate MAC subnet masks and alternate hash functions until a match is found in the lookup table. If no match can be found, standard switching methods may be used.

Figure 10:
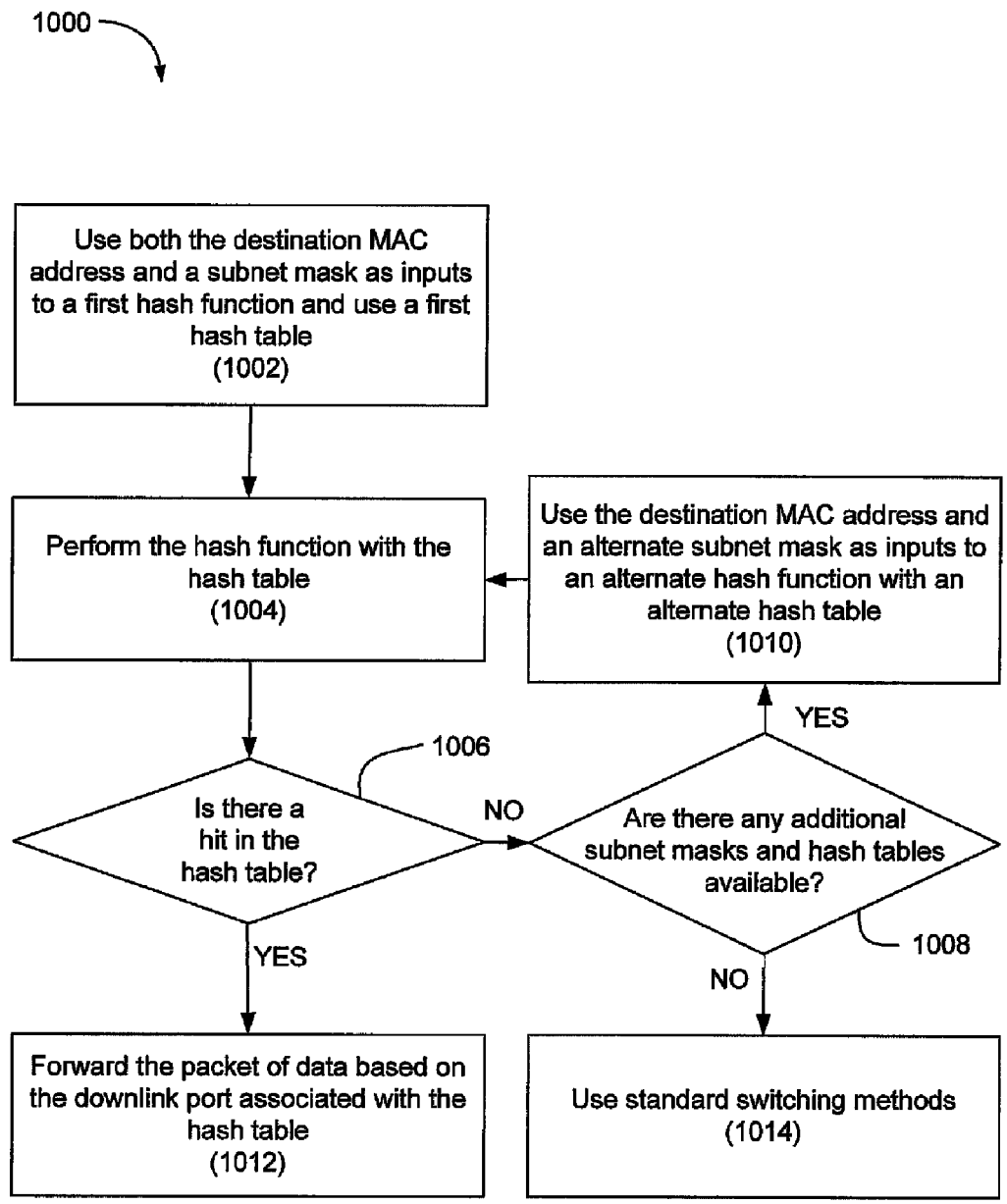
FIG. 10 is a flow chart illustrating an exemplary hash method which could be used by network switches on a fat-tree network, according to one embodiment of principles described herein.

FIG. 10 is a flow chart illustrating an exemplary hash based lookup method (1000) which could be used by network switches on a fat-tree network to determine how to forward a data packet. The first step would be to use (step 1002) both the destination MAC address and a MAC subnet mask as inputs to a first hash function for use with a first hash table. Next, the hash function is performed (step 1004) using the hash table. If there is a hit (decision 1006, YES) in the hash table, the data packet will be forwarded (step 1012) based on the downlink port associated with the hit MAC address in the hash table. If there is a miss (decision 1006, NO), it will then be determined if there are any additional subnet masks and hash tables available. If there are additional subnet masks and hash tables available (decision 1008, YES), then an alternate subnet mask and an alternate hash function will be used (step 1010) with an alternate hash table. The process will then be repeated until a match is found. If no match is found and there are no additional subnet masks and hash tables available (decision 1008, NO), then standard switching methods may be used (step 1014). This may be the case if the destination MAC address is not using a customized MAC address.

In sum, by using modified switches which forward data based on MAC address subnetting, an efficient networking structure can be utilized at a much lower cost than many traditional forwarding methods for a fat tree based network topology. In addition, when a host device changes ports to a different MAC subnet, only the MAC address needs to be changed, the IP address can remain the same. This can be beneficial as many network applications are based on IP addresses and not MAC address.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for routing data on a fat-tree network using network switches, the method comprising:
   assigning a customized MAC address to each host device in said network, said customized MAC address comprising:
      a set of bits for each level in said fat-tree network, each said set of bits corresponding to a division of said network in which said host device is located; and
   at each switch, applying a first MAC subnet mask to a destination MAC address of each received data packet and performing at least one hashing function on said masked destination MAC address to determine a forwarding port for said data packet.

2. The method of claim 1, in which all said switches and host devices associated with a particular pod have a MAC address with at least one of said sets of bits being the same.

3. The method of claim 1, in which all host devices connected to the same edge switch have the same identifying number in one said set of bits.

4. The method of claim 1, in which said first MAC subnet mask applied by said at least one core switch in said network exposes only one said set of bits from said destination MAC address to said at least one hashing function.

5. The method of claim 1, in which said first MAC subnet mask applied by at least one aggregate switch in said network exposes at least two said sets of bits from said destination MAC address to said at least one hashing function.

6. The method of claim 1, in which said first MAC subnet mask applied by at least one edge level switch in said network exposes in said MAC address each of all said sets of bits to said at least one hashing function.

7. The method of claim 1, further comprising querying a hash table with an output of said hashing function to determine said forwarding port.

8. The method of claim 7, further comprising determining said forwarding port by:

querying a first hash table with said destination MAC address masked by said first mask;

responsive to detecting a match in said first hash table, forwarding said data packet based on a downlink port associated with said match in said first hash table; and responsive to a failure to detect a match in said first hash table, querying a next hash table with said destination MAC address masked by a next MAC subnet mask and forwarding said data packet based on an uplink port associated with a match in said next hash table.

9. The method of claim 1, further comprising dynamically assigning said MAC address to said host device responsive to said host device connecting to an edge switch in said network.

10. A fat-tree network, the network comprising:
a hierarchical plurality of network switches, each said switch being configured to apply a first MAC subnet mask to a destination MAC address of each packet received by said switch and perform at least one hashing function on said masked destination MAC address to determine a forwarding port for said packet; said destination MAC address comprising:
a set of bits for each level in said fat-tree network, each said set of bits corresponding to a division of said network in which said host device is located.

11. The network of claim 10, in which all said switches and host devices associated with a particular pod have a MAC address with at least one said set of bits being the same.

12. The network of claim 10, in which all host devices connected to the same edge switch have the same identifying number in one said set of bits.

13. The network of claim 10, in which said first MAC subnet mask applied by at least one core switch in said network exposes only one set of bits from said destination MAC address to said at least one hashing function.

14. The network of claim 10, in which said first MAC subnet mask applied by at least one aggregate switch in said network exposes at least two of said sets of bits from said destination MAC address to said at least one hashing function.

15. The network of claim 10, in which said first MAC subnet mask applied by at least one edge level switch in said network exposes in said MAC address each of said set of bits to said at least one hashing function.

16. The network of claim 10, in which each of said switches is further configured to use an output of said hashing function to query a hash table to determine said forwarding port.

17. The network of claim 10, in which each of said switches is further configured to determine said forwarding port by:

querying a first hash table with said destination MAC address masked by said first mask;

responsive to detecting a match in said first hash table, forwarding said data packet based on a downlink port associated with said match in said first hash table; and responsive to a failure to detect a match in said first hash table, querying a next hash table with said destination MAC address masked by a second mask and forwarding said data packet based on an uplink port associated with a match in said next hash table.

18. The network of claim 10, in which each edge switch of said network is configured to dynamically assign said MAC address to said host device responsive to detecting a connection to said host device.

19. A computer program product for routing data on a network, the computer program product comprising:
a non-transitory computer-readable storage medium having computer-readable program code stored thereon, said computer-readable program code comprising;
computer-readable program code configured to apply a MAC subnet mask to a destination MAC address of each packet received by a network switch;
computer-readable program code configured to performing at least one hashing function on said masked destination MAC address to determine a forwarding port for said packet;
in which said destination MAC address indicates a destination host device and comprises:
a set of bits for each level in fat-tree network, each said set of bits corresponding to a division of said network in which said host device is located.

20. The computer program product of claim 19, further comprising:
computer-readable program code configured to query a first hash table with said destination MAC address masked by said first mask;
computer-readable program code configured to, responsive to detecting a match in said first hash table, forward said data packet based on a downlink port associated with said match in said first hash table; and
computer-readable program code configured to, responsive to a failure to detect a match in said first hash table, query a secondary hash table with said destination MAC address masked by a next mask and forward said data packet based on an uplink port associated with a match in said next hash table.

* * * * *

UNITED STATES PATENT AND TRADEMARK OFFICE
CERTIFICATE OF CORRECTION

| | |
|---|---|
| PATENT NO. | : 8,175,107 B1 |
| APPLICATION NO. | : 12/543118 |
| DATED | : May 8, 2012 |
| INVENTOR(S) | : Praveen Yalagandula et al. |

It is certified that error appears in the above-identified patent and that said Letters Patent is hereby corrected as shown below:

In the Claims

In column 12, line 29, in Claim 19, delete "in" and insert -- in a --, therefor.

Signed and Sealed this
Third Day of September, 2013

Teresa Stanek Rea
*Acting Director of the United States Patent and Trademark Office*